(12) United States Patent
Shaphy et al.

(10) Patent No.: US 9,092,572 B2
(45) Date of Patent: Jul. 28, 2015

(54) DEVELOPMENT LIFE CYCLE MANAGEMENT TOOL FOR SET-TOP BOX WIDGETS

(75) Inventors: Muhammed Shaphy, Irving, TX (US); Xiangyang Miao, Flower Mound, TX (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 356 days.

(21) Appl. No.: 13/429,536

(22) Filed: Mar. 26, 2012

(65) Prior Publication Data

US 2013/0254669 A1    Sep. 26, 2013

(51) Int. Cl.
| | |
|---|---|
| G06F 3/048 | (2013.01) |
| G06F 11/36 | (2006.01) |
| G06F 3/0483 | (2013.01) |
| G06F 3/0481 | (2013.01) |
| G06F 3/01 | (2006.01) |
| G06F 3/0484 | (2013.01) |

(52) U.S. Cl.
CPC .......... *G06F 11/3664* (2013.01); *G06F 3/0481* (2013.01); *G06F 3/0483* (2013.01); *G06F 3/0484* (2013.01)

(58) Field of Classification Search
CPC .... G06F 3/0481; G06F 3/0483; G06F 3/0484
USPC .......... 715/205, 234, 760, 764, 809; 725/100, 725/135, 136
See application file for complete search history.

(56) References Cited

U.S. PATENT DOCUMENTS

| | | | |
|---|---|---|---|
| 7,451,391 B1* | 11/2008 | Coleman et al. | 715/234 |
| 7,934,162 B2* | 4/2011 | Wong et al. | 715/747 |
| 2002/0004854 A1* | 1/2002 | Hartley | 709/328 |
| 2004/0003400 A1* | 1/2004 | Carney et al. | 725/42 |
| 2004/0107125 A1* | 6/2004 | Guheen et al. | 705/7 |
| 2004/0226051 A1* | 11/2004 | Carney et al. | 725/135 |
| 2008/0052372 A1* | 2/2008 | Weber et al. | 709/217 |
| 2008/0244681 A1* | 10/2008 | Gossweiler et al. | 725/133 |
| 2008/0276279 A1* | 11/2008 | Gossweiler et al. | 725/46 |
| 2009/0083374 A1* | 3/2009 | Saint Clair | 709/203 |
| 2010/0313169 A1* | 12/2010 | Huang et al. | 715/835 |
| 2010/0321201 A1* | 12/2010 | Huang et al. | 340/825.22 |
| 2011/0214148 A1* | 9/2011 | Gossweiler et al. | 725/46 |
| 2011/0239044 A1* | 9/2011 | Kumar et al. | 714/15 |
| 2011/0252427 A1* | 10/2011 | Olston | 718/102 |
| 2011/0258659 A1* | 10/2011 | Carney et al. | 725/32 |
| 2012/0102458 A1* | 4/2012 | Meijer et al. | 717/123 |
| 2012/0166642 A1* | 6/2012 | Saint Clair et al. | 709/225 |
| 2012/0254912 A1* | 10/2012 | Carney et al. | 725/32 |
| 2012/0297341 A1* | 11/2012 | Glazer et al. | 715/810 |
| 2013/0024906 A9* | 1/2013 | Carney et al. | 725/135 |
| 2013/0104178 A1* | 4/2013 | Babu et al. | 725/107 |
| 2013/0212472 A1* | 8/2013 | Diament et al. | 715/255 |

* cited by examiner

Primary Examiner — Nicholas Augustine

(57) ABSTRACT

A network device presents a widget development web user interface to a user, and receives code for script of a widget from the user via the web user interface. The network device receives a selection of a type of set-top box (STB) from a list of multiple types of STBs from the user via the web user interface. The network device receives a selection of a STB environment, from a list of STB environments, associated with the selected type of STB. The network device executes the script of the widget within the selected type of STB having the selected STB environment to test the widget.

23 Claims, 18 Drawing Sheets

US 9,092,572 B2

DEVELOPMENT LIFE CYCLE MANAGEMENT TOOL FOR SET-TOP BOX WIDGETS

BACKGROUND

Set-Top Boxes (STBs) are used primarily for tuning among channels on a network, such as, for example, a cable network (e.g., an optical fiber network), to acquire and lock to specific channels to enable content transmitted on those channels to be displayed on display devices (e.g., televisions) connected to each of the STBs. STBs may have the capability to store and execute widgets. These widgets include small applications that the STB can execute to render graphics and images on the television screen, and to perform other functions.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Figure 1:
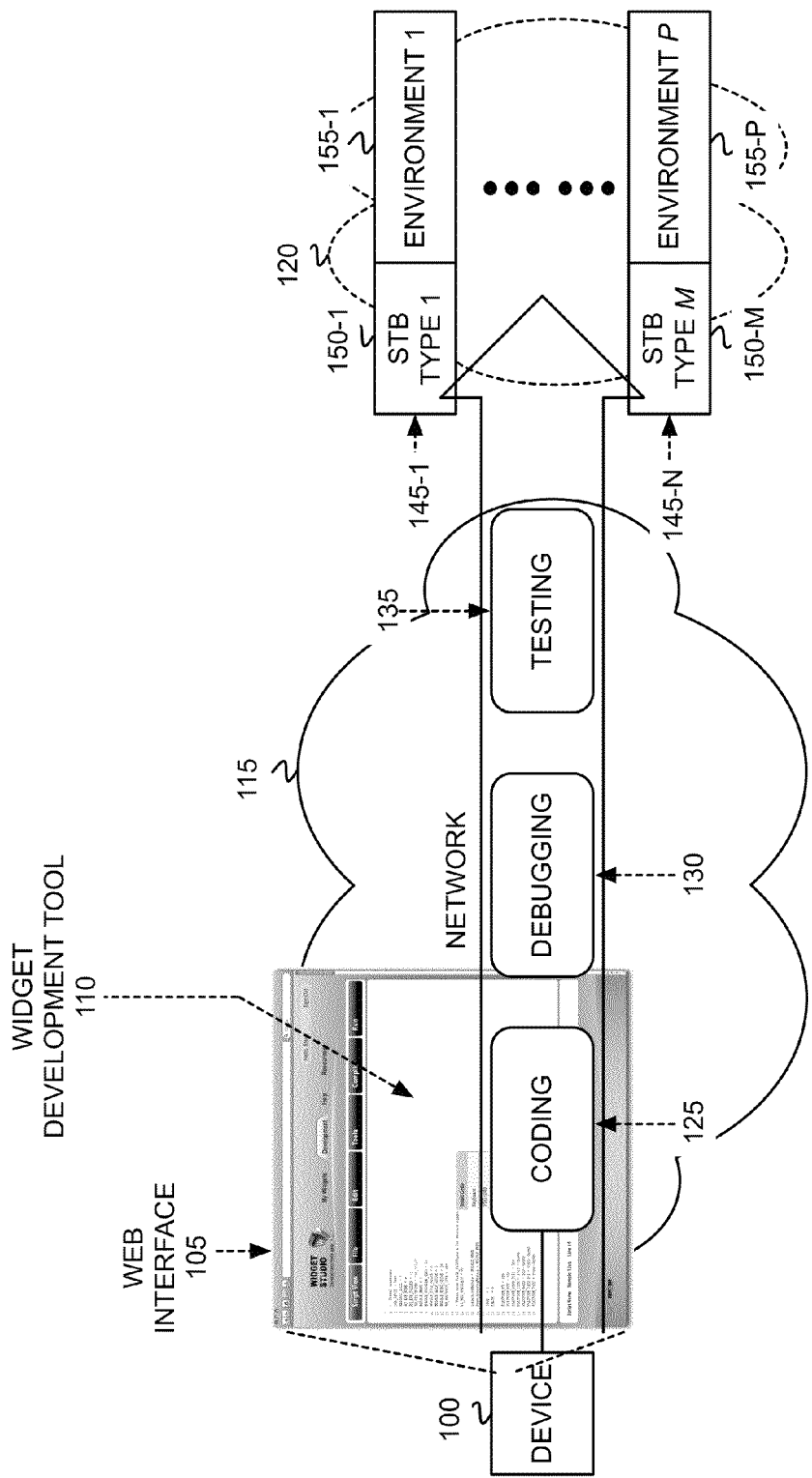
FIG. 1 is a diagram that illustrates an exemplary overview of the use of a web-based development tool that can be used to develop custom set-top box (STB) widgets.

FIG. 1 illustrates an exemplary overview of the use of a web-based development tool that can be used to develop custom set-top box (STB) widgets. A "widget," as referred to herein, includes a small software application that a STB can execute to render graphics or images on a screen (e.g., television screen), and/or to perform other functions associated with the STB. As shown in FIG. 1, a device 100 may use a web interface 105 to access a widget development tool 110 via a network 115. Device 100 may include, for example, a telephone (e.g., smart phone); a laptop, desktop, palmtop or tablet computer; a personal digital assistant (PDA); or any other type of digital computing device that may communicate via network 115. Device 100 may implement a web browser that may access widget development tool 110 via web interface 105. Widget development tool 110 may include a web-based, interactive widget development life cycle (WDLC) management tool that can be used to code, debug, and test one or more customized widgets for execution by multiple different STBs 145-1 through 145-N within a cloud environment 120.

As depicted in FIG. 1, the development life cycle management processes performed by widget development tool 110 may include coding 125, debugging 130, and testing 135. Coding 125 may include a user of device 100 entering new script and/or editing existing script for a custom widget. In one exemplary implementation, a customer widget may be coded using the Lua programming language. Other programming languages, however, may alternatively be used. Debugging 130 may include using debugging functionality of widget development tool 110 to execute a custom widget, within a STB having a selected STB type and a selected STB environment, in a debug mode such that debug results can be viewed by the user of device 100. Testing 135 may include the creation of one or more test cases to be executed along with a selected custom widget, and the line-by-line execution of the one or more test cases, along with execution of a custom widget, to generate a test results summary that may be viewed by a user of device 100. Each of the test cases may define one or more interactions that occur with a STB, such as, for example, one or more button selections on the STB's remote control. A test case may be executed in conjunction with the execution of a custom widget to identify whether the one or more interactions of the test case are successful when the widget is executing. A test case may, therefore, provide simulated user input and interaction with a STB executing a widget.

STBs 145-1 through 145-N may reside in a cloud environment 120 and may include multiple different types 150-1 through 150-M of STBs and multiple different environments 155-1 through 155-P. Types 150-1 through 150-M of STBs may include a different manufacturer and/or model for each different type. Environments 155-1 through 155-P may each include different hardware, firmware, or middleware, and/or a different operating system. Therefore, each STB 145 in cloud environment 120 may include its own unique combination of STB type 150 and STB environment 155. Each of STBs 145-1 through 145-n in cloud environment 120 may include a real STB (e.g., stand alone) or a virtual STB (e.g., simulated within another network device).

Figure 2:
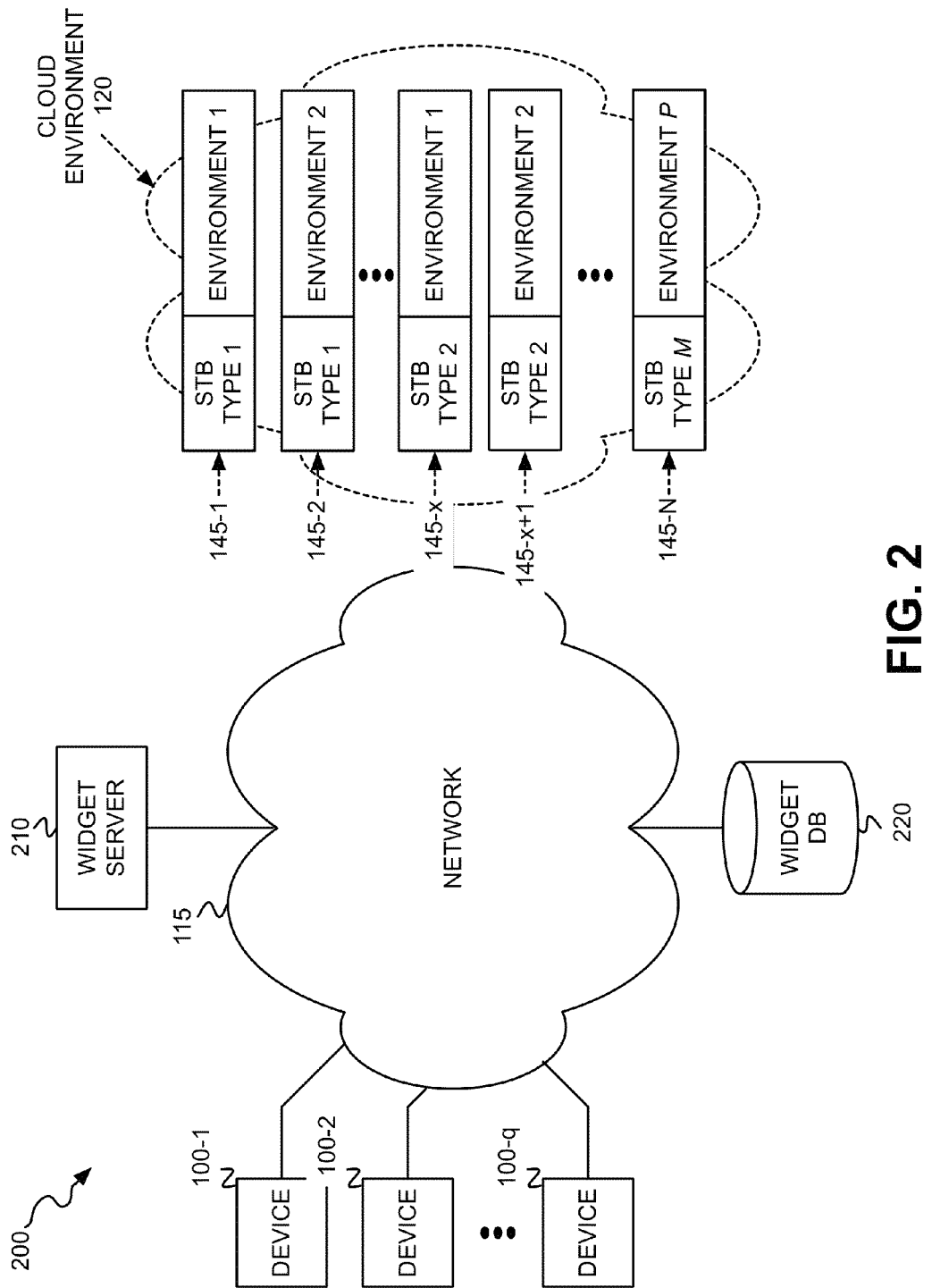
FIG. 2 is a diagram that depicts an exemplary network environment in which the widget development tool of FIG. 1 may be accessed via a web interface at multiple different devices to create and/or edit custom widgets that can be executed by one or more STBs in a cloud environment.

FIG. 2 depicts an exemplary network environment 200 in which widget development tool 110 (shown in FIG. 1) may be accessed via web interface 105 at multiple different devices 100-1 through 100-q to create and/or edit custom widgets that can be tested within STBs 145-1 through 145-N in cloud environment 120. As shown, network environment 200 may include devices 100-1 through 100-q, network 115, cloud environment 120, widget server 210 and widget database (DB) 220.

Widget server 210 may include a network device that enables devices 100 to access, retrieve and execute widget development tool 110 via web interface 105 (not shown in FIG. 2). Widget server 210 may enable users at devices 100-1 through 100-q to execute widget development tool 110 to create, debug, and/or test custom widgets, and to retrieve and/or store custom widgets in widget DB 220. Widget DB 220 may include a network device that stores a data structure, such as, for example, a database. Widget DB 220 may store, among other data, custom widgets created or edited by users at devices 100-1 through 100-q.

Cloud environment 120 may include multiple different STBs 145-1 through 145-N, with, as described above with respect to FIG. 1, each of STBs 145-1 through 145-N having a different unique combination of a STB type and a STB environment.

The configuration of components of network environment 200 illustrated in FIG. 2 is for illustrative purposes. Other configurations may be implemented. Network environment 200 may include additional, fewer and/or different components than those depicted in FIG. 2.

Figure 3:
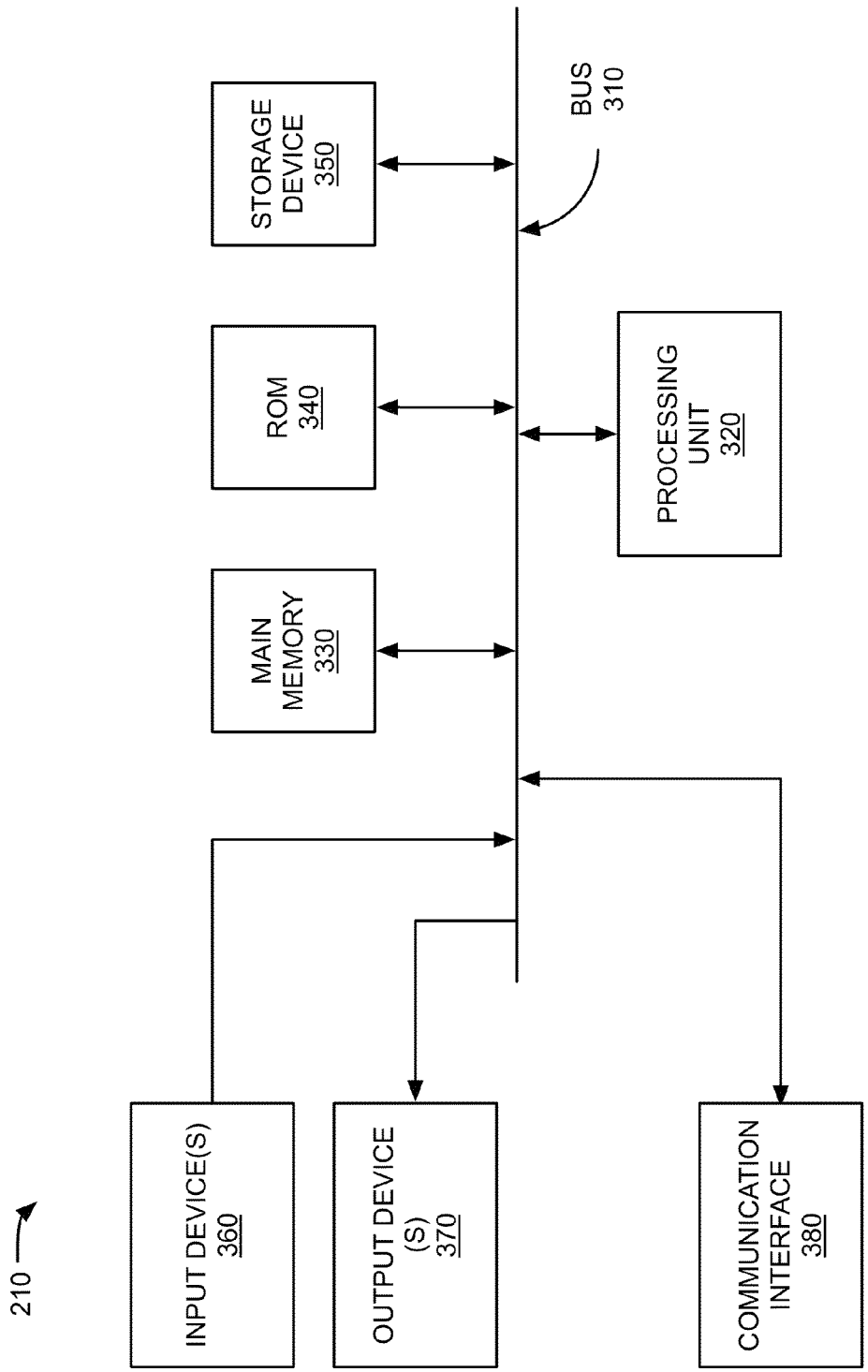
FIG. 3 is a diagram that depicts exemplary components of the widget server of FIG. 2.

FIG. 3 is a diagram that depicts exemplary components of widget server 210. Device 100 and widget DB 220 may be similarly configured. Widget server 210 may include a bus 310, a processing unit 320, a main memory 330, a read only memory (ROM) 340, a storage device 350, an input device(s) 360, an output device(s) 370, and a communication interface (s) 380. Bus 310 may include a path that permits communication among the components of widget server 210.

Processing unit 320 may include one or more processors or microprocessors, or processing logic, which may interpret and execute instructions. Main memory 330 may include a random access memory (RAM) or another type of dynamic storage device that may store information and instructions for execution by processing unit 320. ROM 340 may include a ROM device or another type of static storage device that may store static information and instructions for use by processing unit 320. Storage device 350 may include a magnetic, optical, and/or other type of data storage device (e.g., a flash drive). Main memory 330, ROM 340 and storage device 350 may each be referred to herein as a "tangible non-transient computer-readable medium."

Input device 360 may include one or more mechanisms that permit an operator to input information to widget server 210, such as, for example, a keypad or a keyboard, a display with a touch sensitive panel, voice recognition and/or biometric mechanisms, etc. Output device 370 may include one or more mechanisms that output information to the operator, including a display, a speaker, etc. Communication interface(s) 380 may include a transceiver that enables widget server 210 to communicate with other devices and/or systems. For example, communication interface(s) 380 may include wired or wireless transceivers for communicating via network 115.

The configuration of components of widget server 210 illustrated in FIG. 3 is for illustrative purposes. Other configurations may be implemented. Therefore, widget server 210 may include additional, fewer and/or different components than those depicted in FIG. 3.

Figure 4:
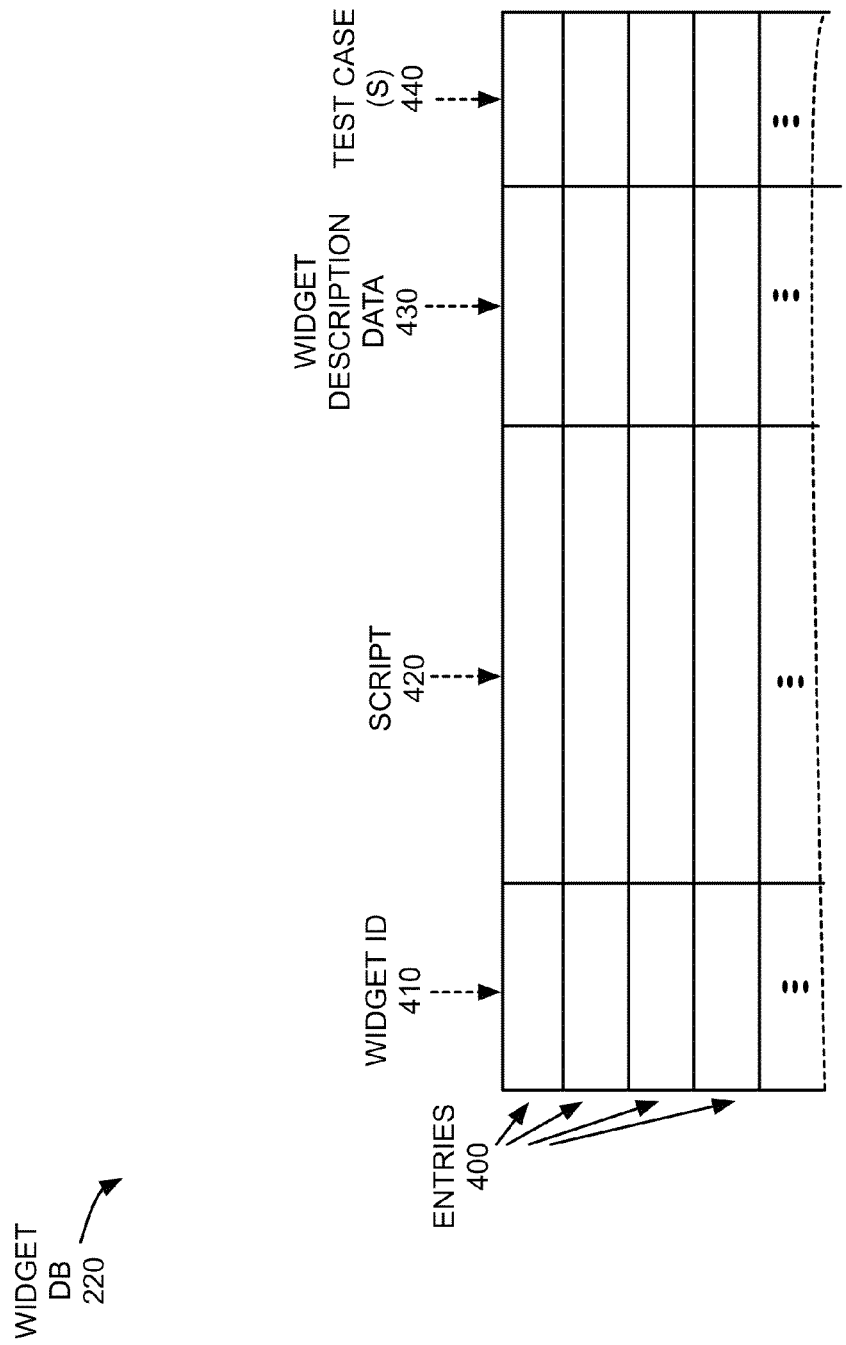
FIG. 4 is a diagram that depicts an exemplary implementation of the widget database of FIG. 2.

FIG. 4 is a diagram that depicts an exemplary implementation of widget DB 220. As shown, widget DB 220 may include multiple entries 400, which each entry 400 including a widget identifier (ID) field 410, a script field 420, a widget description data field 430, and a test case(s) field 440.

Widget ID field 410 may store a unique ID for a custom widget created and/or edited by a user at a device 100. Script field 420 may store script (e.g., code) for the custom widget identified by widget ID field 410 of a respective entry 400. Widget description data field 430 may store various data about the custom widget identified by widget ID field 410 of a respective entry 400. For example, widget description data field 430 may include a name, a creation date, a date the widget was last updated, and/or a textual description of a purpose or function of the custom widget. Test case(s) field 440 may store one or more test cases that have been generated by users at devices 100-1 through 100-q for testing the custom widget identified by widget ID field 410 of a respective entry 400.

The number, types, and content of the entries and/or fields in widget DB 220 illustrated in FIG. 4 is for illustrative purposes. Other data structures having different numbers of, types of and/or content of, the entries and/or the fields may be implemented. Therefore, widget DB 220 may include additional, fewer and/or different entries and/or fields than those depicted in FIG. 4.

Figure 5A:
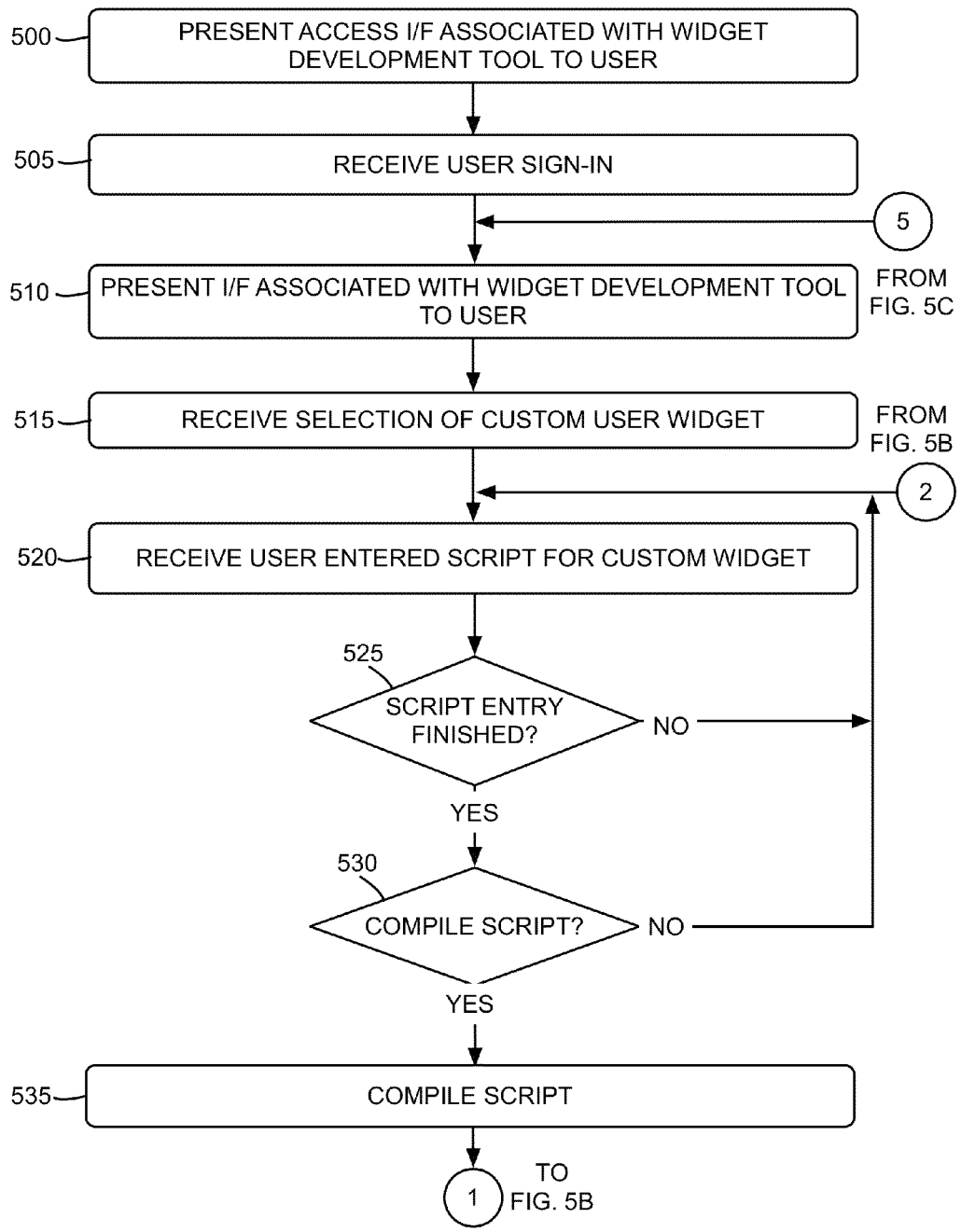
FIGS. 5A-5C are flow diagrams that depict an exemplary process for creating custom widgets using the widget development tool of FIG. 1.
Figure 5B:
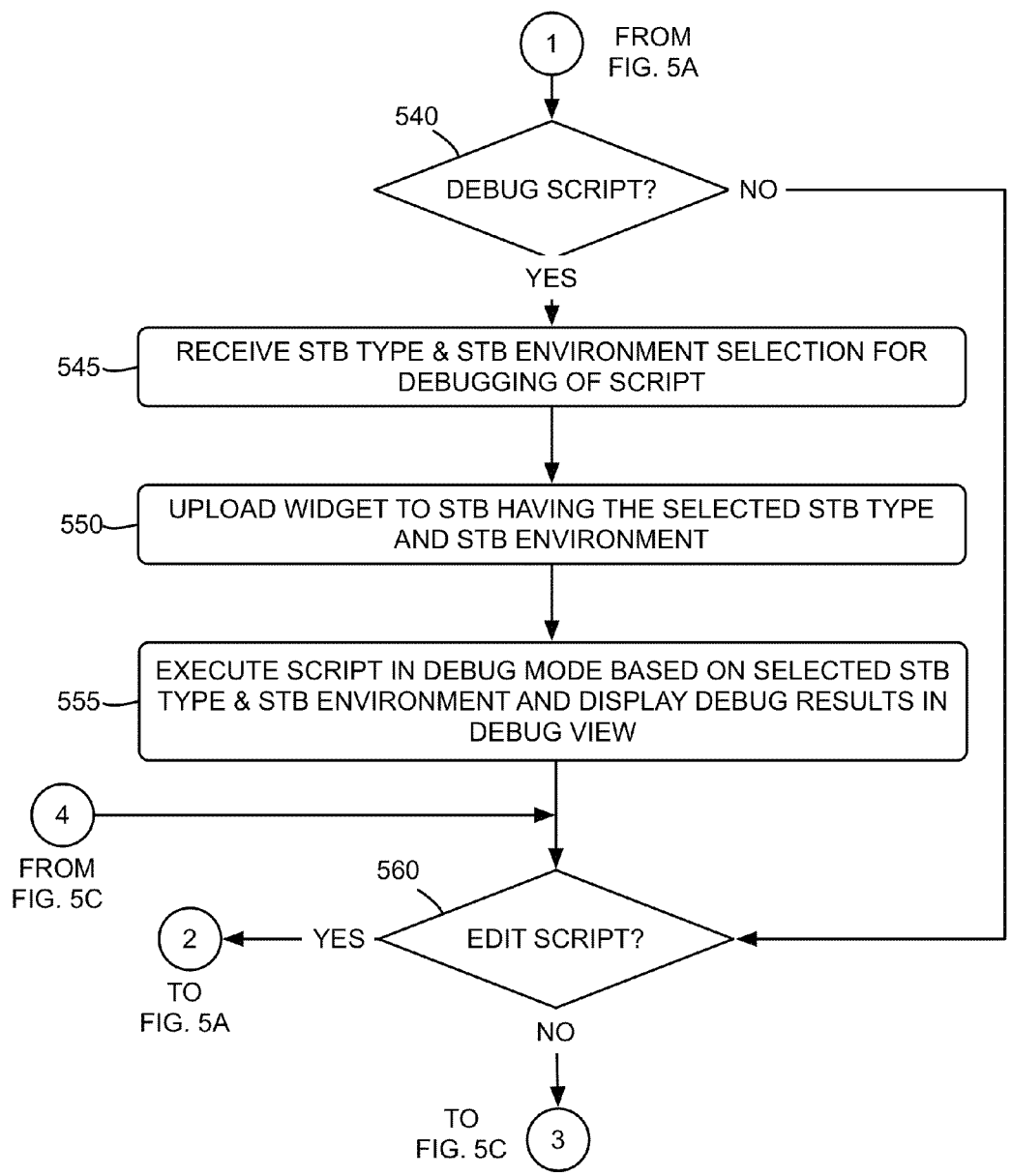
Figure 5C:
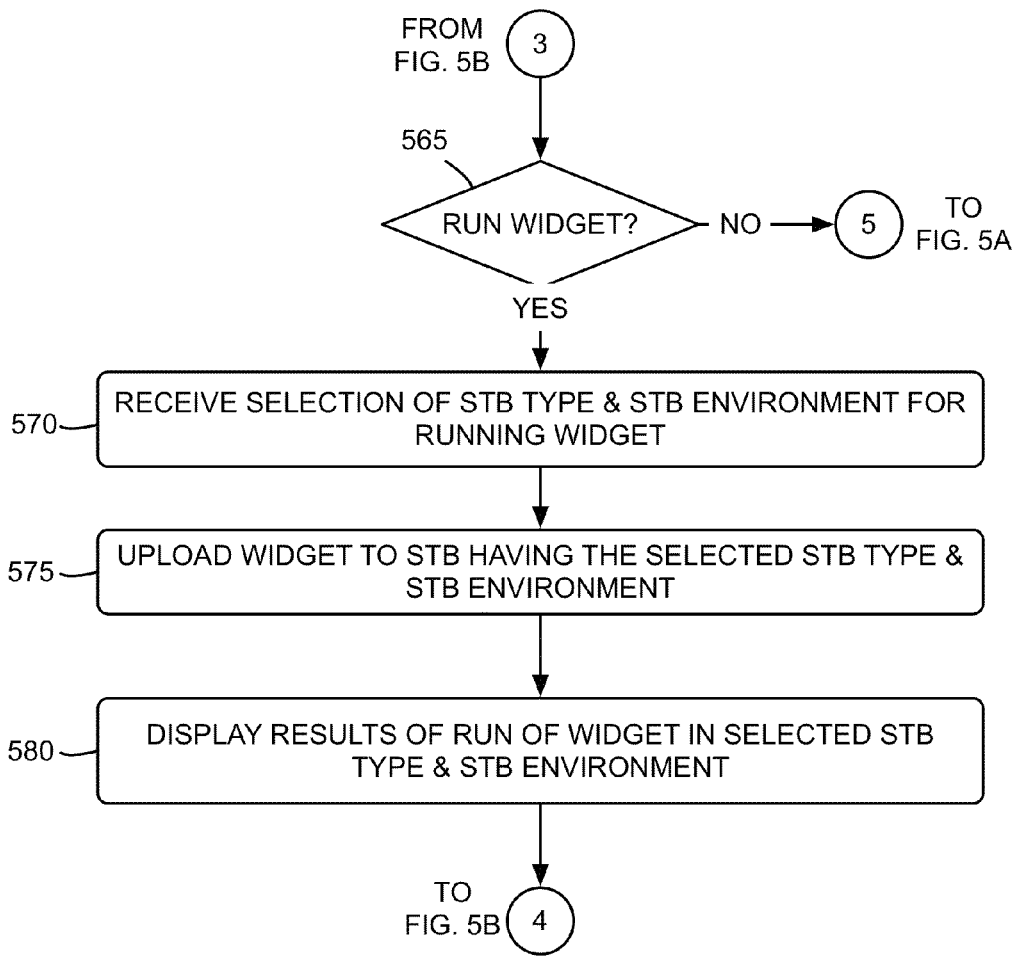

FIGS. 5A-5C are flow diagrams that depict an exemplary process for creating custom widgets using widget development tool 110. The exemplary process of FIGS. 5A-5C may be implemented by widget server 210 in conjunction with the execution of widget development tool 110 by device 100 via web interface 105. The description of the exemplary process of FIGS. 5A-5C below refers to the examples of FIGS. 6-11.

Figure 6:
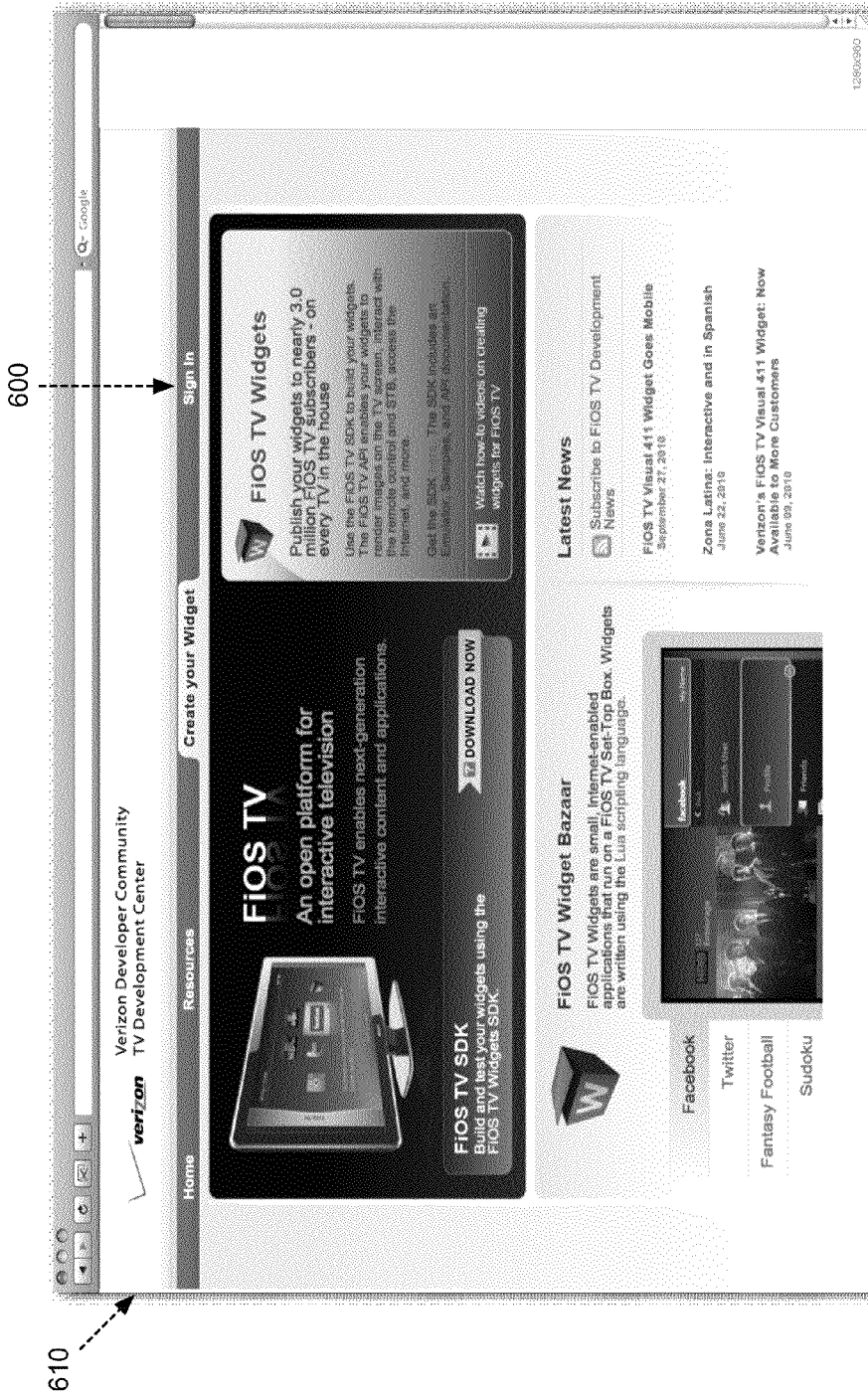
FIGS. 6-11 are diagrams that depict examples associated with the exemplary process of FIGS. 5A-5C.
Figure 7:
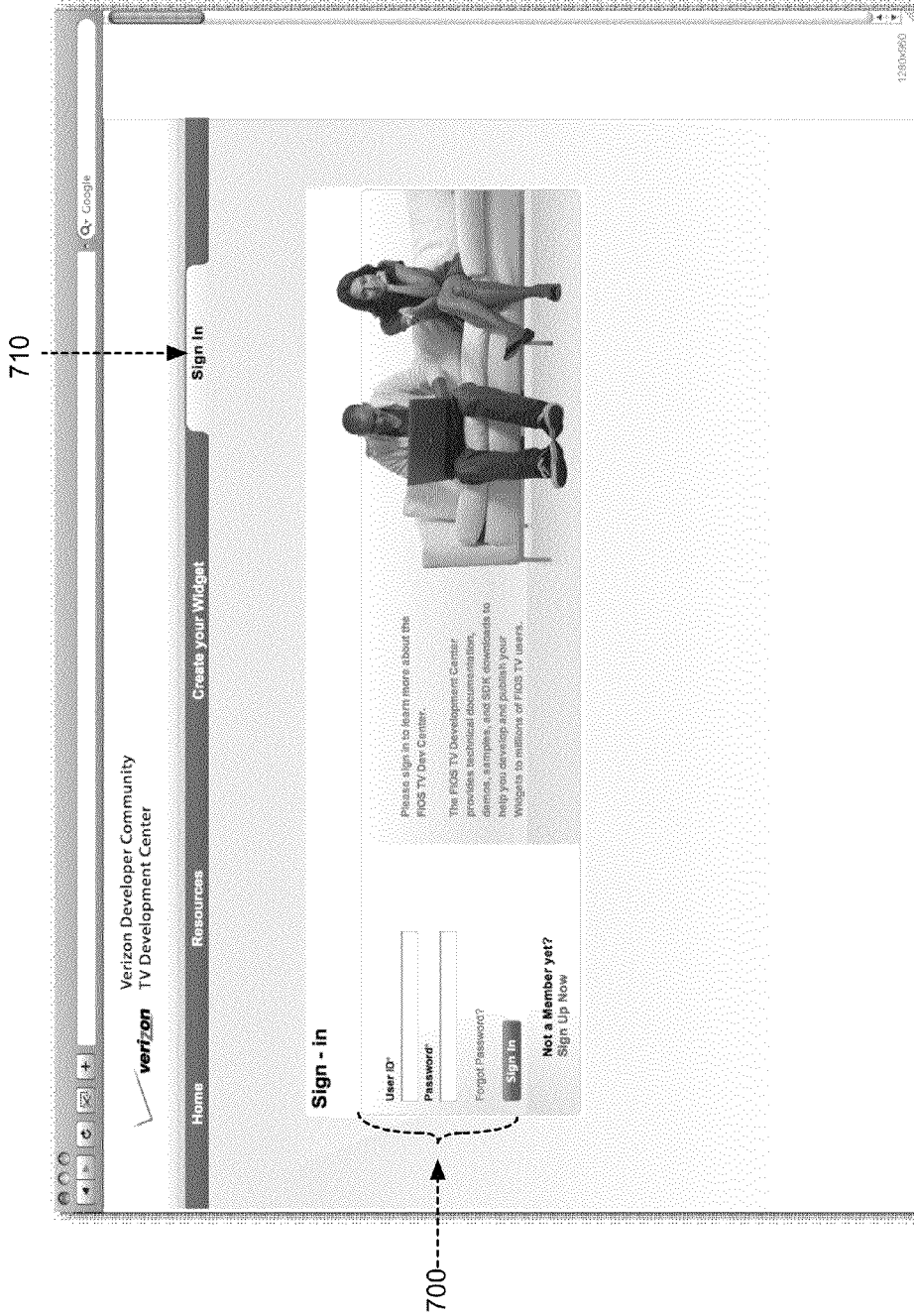

The exemplary process may include widget server 210 presenting an access interface associated with widget development tool 110 to the user of device 100 (block 500). Device 100, via a web browser and web interface 105, may access one or more interfaces associated with widget development tool 110. For example, as shown in FIG. 6, device 100 may select (e.g., "click on") a "sign-in" tab 600 in an access interface 610. Widget server 210 may receive the user sign-in (block 505). Device 100 may receive the user's ID and password via web interface 105. For example, as shown in FIG. 7, the user's user ID and password 700 may be entered within a "sign-in" window 710 presented to the user via device 100.

Figure 8:
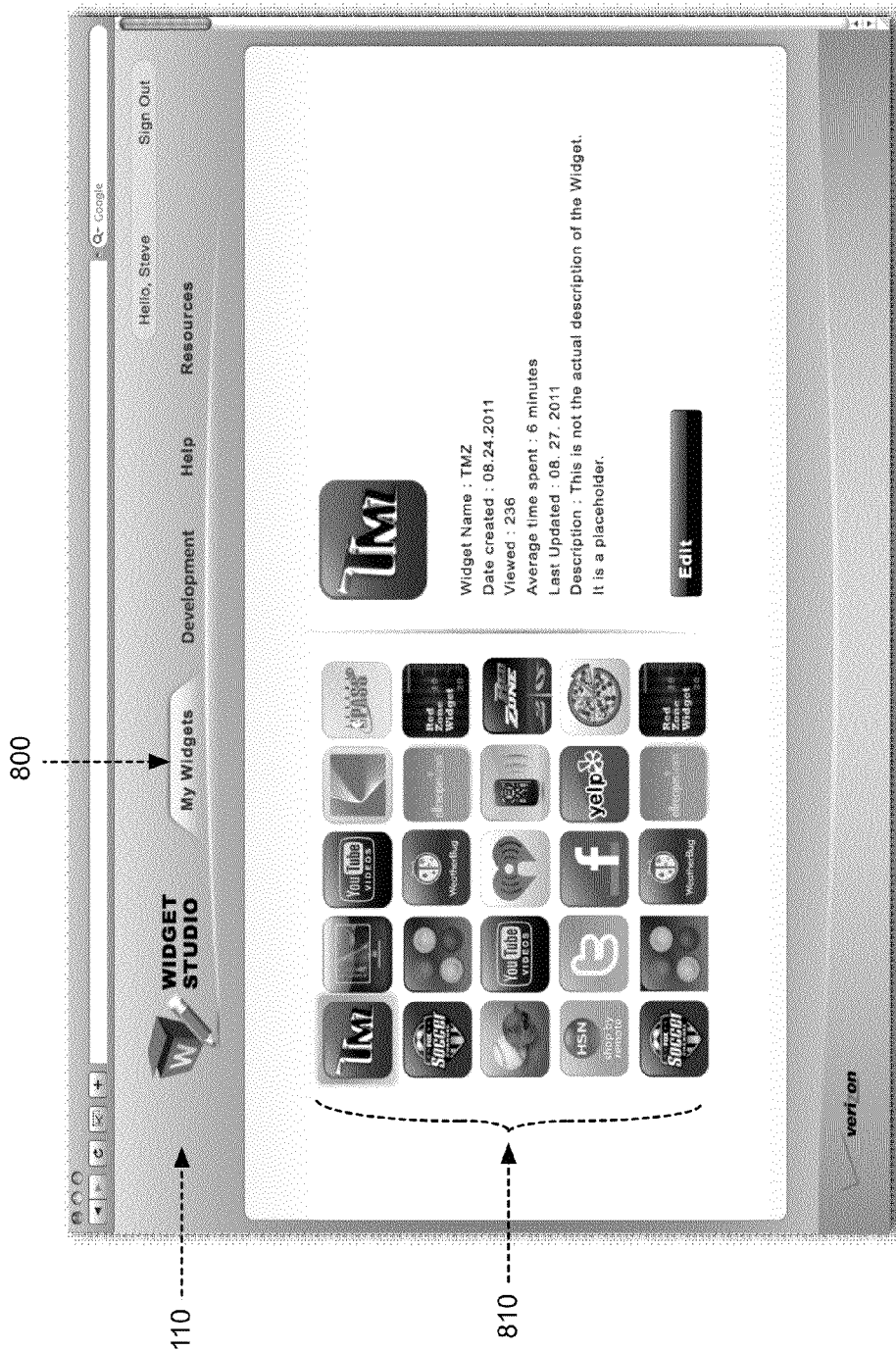

Widget server 210 may present an interface associated with widget development tool 110 to the user of device 100 (block 510). For example, FIG. 8 depicts widget development tool 110's interface as presented to a user via web interface 105. Widget development tool 110 may include a "My widgets" tab 800 that permits the user to select from a set 810 of previously created custom widgets. As further shown in the example of FIG. 9, widget development tool 110 may include a "development" tab 900 that permits the user to retrieve and display the script of an existing custom widget, enter or edit script associated with a custom widget, compile a created custom widget, and/or run a custom widget.

Figure 9:
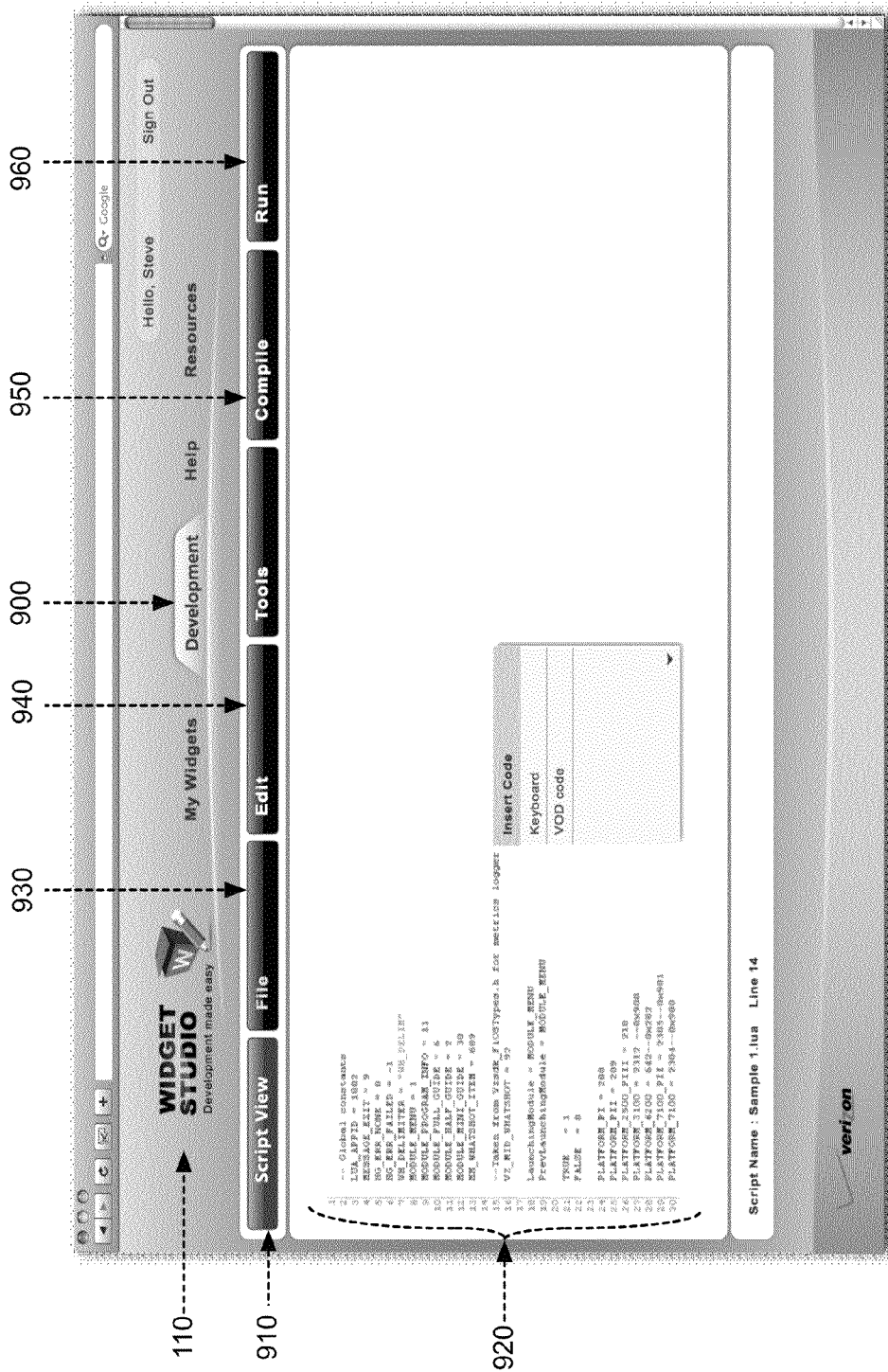

Widget server 210 may receive a selection of a custom user widget (block 515). Referring to the example of FIG. 8, the user of device 100 may select a custom widget from set 810 of previously created custom widgets. Alternatively, as shown in the example of FIG. 9, the user of device 100 may select "file" button 930 to open an existing widget, or to create a new widget. Widget server 210 may receive user entered script for the custom widget (block 520). In the example of FIG. 9, the user of device 100 may select "script view" button 910 to view the script of an existing widget, or the script of a new widget being created. The user of device 100 may insert new lines of script 920 into an existing widget, or into the new widget being created. Widget server 210 may determine if the script entry has finished (block 525). For example, the user may select "file" button 930 from widget development tool 110 and may further select a "save as" button (not shown in FIG. 9) to store the script of the custom widget as a retrievable file. Widget server 210 may store the widget in widget DB 220. For example, widget server 210 may store the widget in an entry 400 of widget DB 220, including storing the widget's script in script field 420, a unique identifier for the widget in widget ID field 410, and data describing the widget in widget description field 430. If the script entry has not finished (NO—block 525), then the exemplary process may return to block 520 with the receipt of additional user entered script for the custom widget. If the script entry has finished (YES—block 525), then widget server 210 may determine if the user has chosen to compile the script (block 530). For example, the user of device 100 may select "compile" button 950 from widget development tool 110 to compile the custom widget. If the user has not chosen to compile the script of the widget (NO—block 530), then the exemplary process may return to block 520 with the receipt of additional user entered script for the custom widget. If the user has chosen to compile the script of the widget (YES—block 530), then widget server 210 may compile the script of the widget (block 535) for debugging and/or running of the widget.

Figure 10:
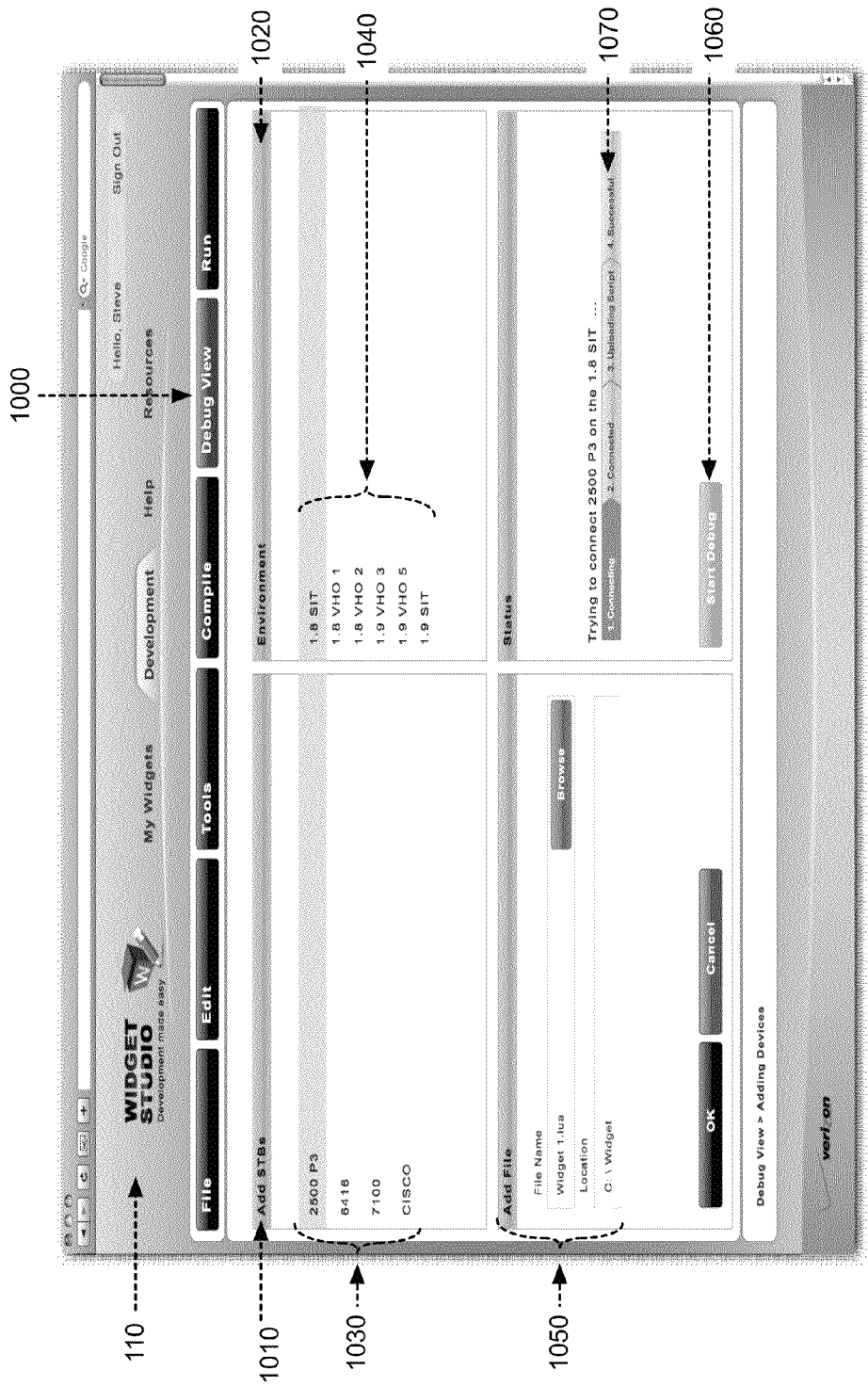
Figure 11:
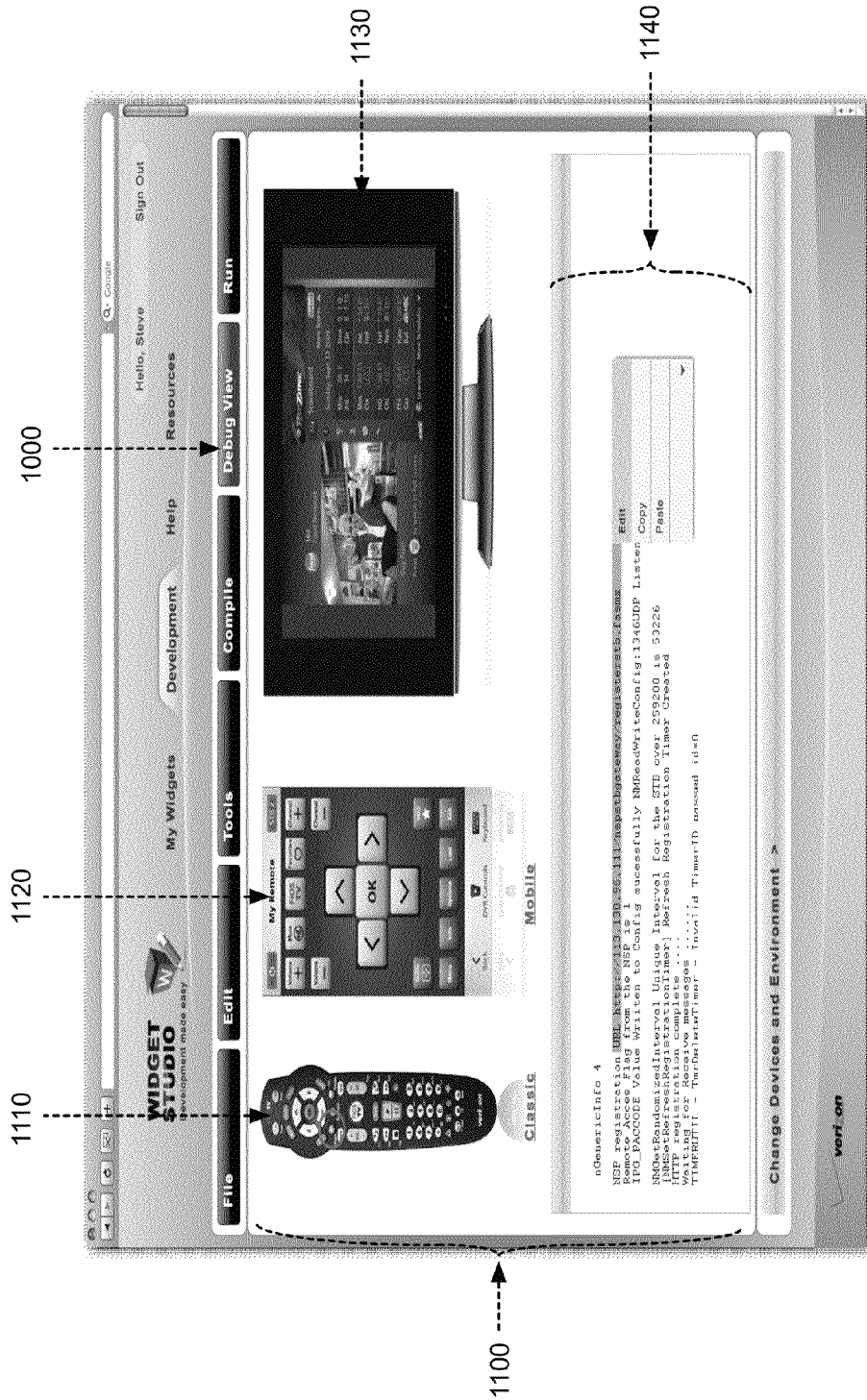

Widget server 210 may determine whether debugging of the script has been selected (block 540). For example, as shown in FIG. 10, the user of device 100 may select "debug view" button 1000 from widget development tool 110 to debug a custom widget in debug mode. If debugging of the script has not been selected (NO—block 540), then the exemplary process may continue at block 560. If debugging of the script has been selected (YES—block 540), then widget server 210 may receive a STB type and STB environment selection for debugging of the script (block 545). The user of device 100 may select both a STB type and STB environment for a STB within which the custom widget can be executed in debug mode. As shown in FIG. 10, widget development tool 110 may present a window 1010 from which different types of STBs may be selected from a list 1030 of types of STBs. As further depicted in FIG. 10, widget development tool 110 may present another window 1020 from which different types of STB environments may be selected from a list 1040 of environments that corresponds to the STB type selected from list 1030. For example, as depicted in FIG. 10, the STB type "2500 P3" has the environments "1.8 SIT," "1.8 VHO 1," "1.8 VHO 2," "1.9 VHO 3," "1.9 VHO 5,"and "1.9 SIT" that may be selected. Upon completion of selection of the STB type from window 1010 and STB environment from window 1020, the user of device 100 may select the widget to be executed in debug mode via an "add file" window 1050. In the example of FIG. 10, the user of device 100 may start the debugging of the selected widget by selecting "start debug" button 1060 from widget development tool 110. Widget server 210 may upload the custom widget to a STB, in cloud environment 120, having the selected STB type and STB environment (block 550). For example, referring to FIG. 2, if STB "type 2" and STB "environment 2" have been selected by the user, then widget server 210 may upload the custom widget to STB 145-x+1 of cloud environment 120. FIG. 10 depicts an upload status 1060 being displayed in widget development tool 110 which displays the connection state of widget server 210 with the STB, and the status of the upload of the script of the widget into the STB. Widget server 210 may execute the script in debug mode based on the selected STB type and STB environment and display the debug results in a debug view (block 555). FIG. 11 depicts an example debug view 1100 in which the interaction of virtual remote devices 1110 and 1120 can be depicted, and the resulting operations of the STB can be displayed 1130 as the debug mode steps through the displayed script 1140.

Widget server 210 may determine whether editing of the script has been selected (block 560). Subsequent to debugging the script of the widget, the user of device 100 may decide to revise the script of the widget (e.g., add to, delete from, or correct) and may select "edit" button 940 (FIG. 9) from widget development tool 110. If editing of the script has been selected (YES—block 560), then the exemplary process may return to block 520 with user entry of revisions to the previously entered script. If editing of the script has not been selected (NO—block 560), then widget server 210 may determine whether running of the custom widget has been selected (block 565). The user of device 100 may select "run" button 960 from widget development tool 110 (FIG. 9) to execute the widget. If running of the custom widget has not been selected (NO—block 565), then the exemplary process may return to block 510. If running of the custom widget has been selected (YES—block 565), then widget server 210 may receive a selection of a STB type and a STB environment for running the widget (block 570). Similar to selecting the debug mode shown in FIG. 10, the user of device 100 may select a STB device type from list 1030 of window 1010, and a corresponding STB environment from list 1040 of window 1020. Widget server 210 may upload the custom widget to a STB in cloud environment 120 having the selected STB type and STB environment (block 575). FIG. 10 depicts an upload status 1070 being displayed in widget development tool 110 which displays the connection state of widget server 210 with the STB, and the status of the upload of the script of the widget into the STB.

Widget server 210 may display the results of the run of the custom widget in the selected STB type and STB environment (block 580). Similar to the debug view 1100 of FIG. 11, the interaction of remote devices 1110 and 1120 can be depicted, and/or the resulting operations of the STB can be displayed 1130 as the widget is executed. The user of device 100 may, thus, interact with remote devices 1110 and/or 1120 in debug view 1100 during the run of the custom widget in the debug mode. The exemplary process may return to block 560 with a determination of whether the user at device 100 desires to edit the script of the custom widget.

The exemplary process of FIGS. 5A-5C may be selectively repeated by a single user to create, debug and/or test multiple different custom widgets. The exemplary process of FIGS. 5A-5C may also be selectively performed by multiple different users at devices 100-1 through 100-q. Therefore, at any one time, widget server 210 may perform multiple parallel versions of the exemplary process of FIGS. 5A-5C such that different users at different ones of devices 100-1 through 100-q may be simultaneously creating and storing custom widgets via a web interface 105. Subsequent to creation and/or testing of a custom widget using the exemplary process of FIGS. 5A-5C, the created widgets may be stored in widget DB 220 and then subsequently uploaded to one or more other STBs (not shown in FIG. 1 or 2) connected to network 115 for future execution by those one or more STBs. Thus, custom widgets created using the exemplary process of FIGS. 5A-5C may be made available for uploading to various STBs for execution at those STBs. In some circumstances, for example, a created first STB widget may be uploaded to a first set of STBs, and a created second STB widget may be uploaded to a second set of STBs, where the first set of STBs may be different than the second set.

The exemplary process of FIGS. 5A-5C has been described as being implemented by widget server 210. However, in some implementations, the exemplary process of FIGS. 5A-5C may be implemented, at least in part, by, or in conjunction with, at least one of STBs 145-1 through 145-N and/or widget DB 220.

Figure 12:
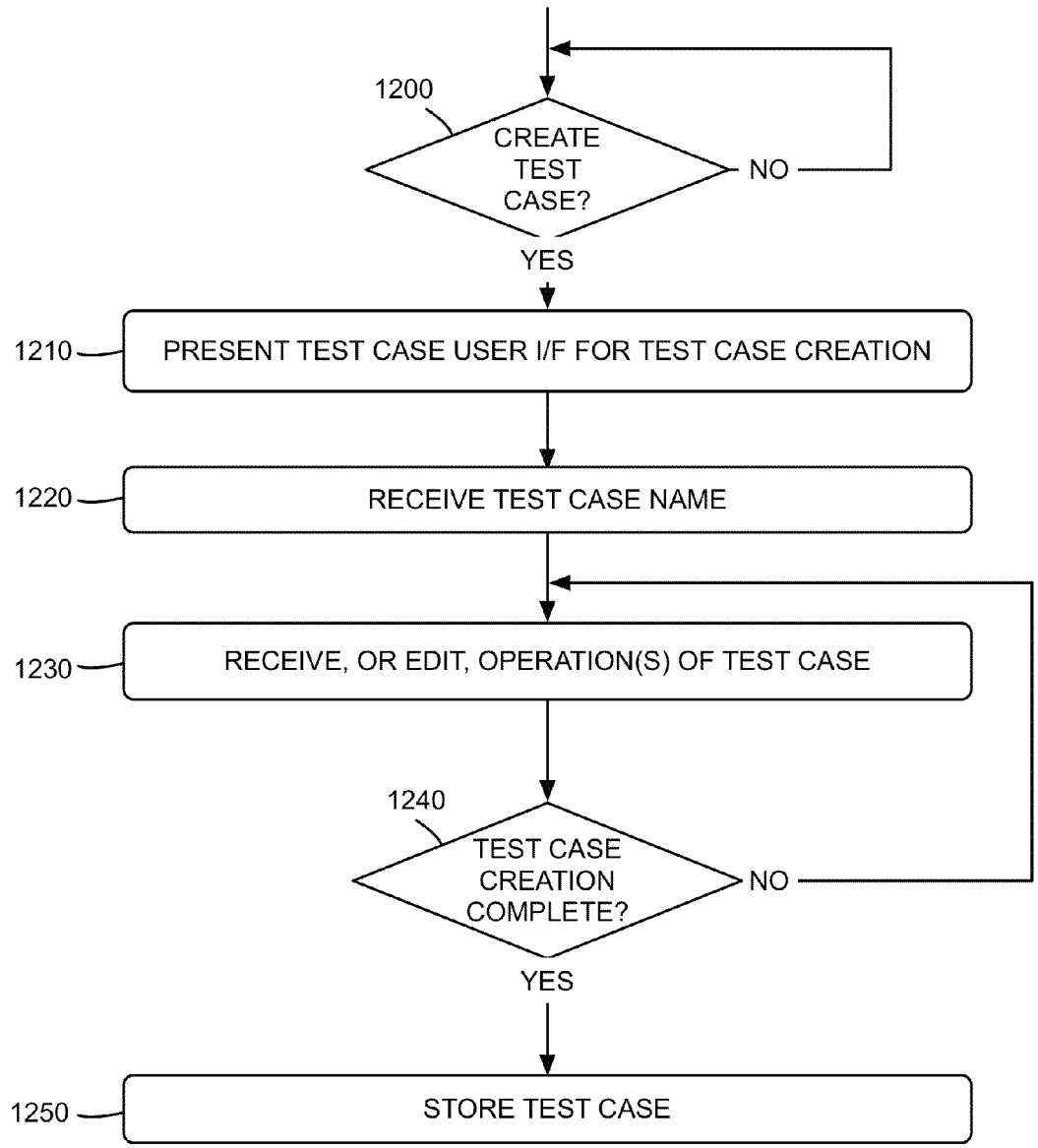
FIG. 12 is a flow diagram that depicts an exemplary process for creating and storing test cases that may be used for testing and validating custom widgets.

FIG. 12 is a flow diagram that depicts an exemplary process for creating and storing test cases that may be used for testing and validating custom widgets. The exemplary process of FIG. 12 may be implemented by widget server 210 in conjunction with the execution of widget development tool 110 by device 100 via web interface 105. The description of the exemplary process of FIG. 12 below refers to the examples of FIGS. 13 and 14.

Figure 13:
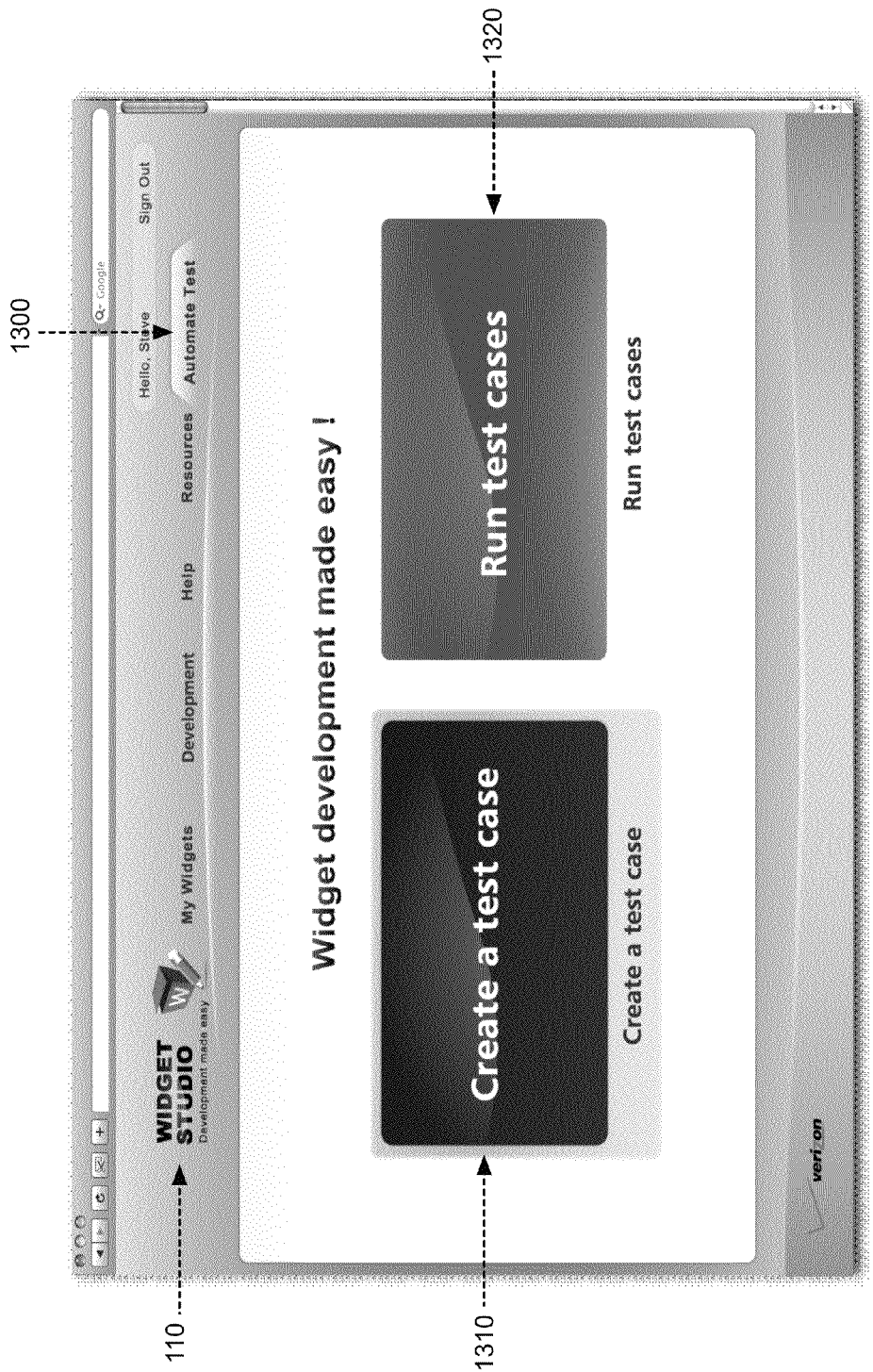
FIGS. 13 and 14 are diagrams that depict examples associated with the exemplary process of FIG. 12.
Figure 14:
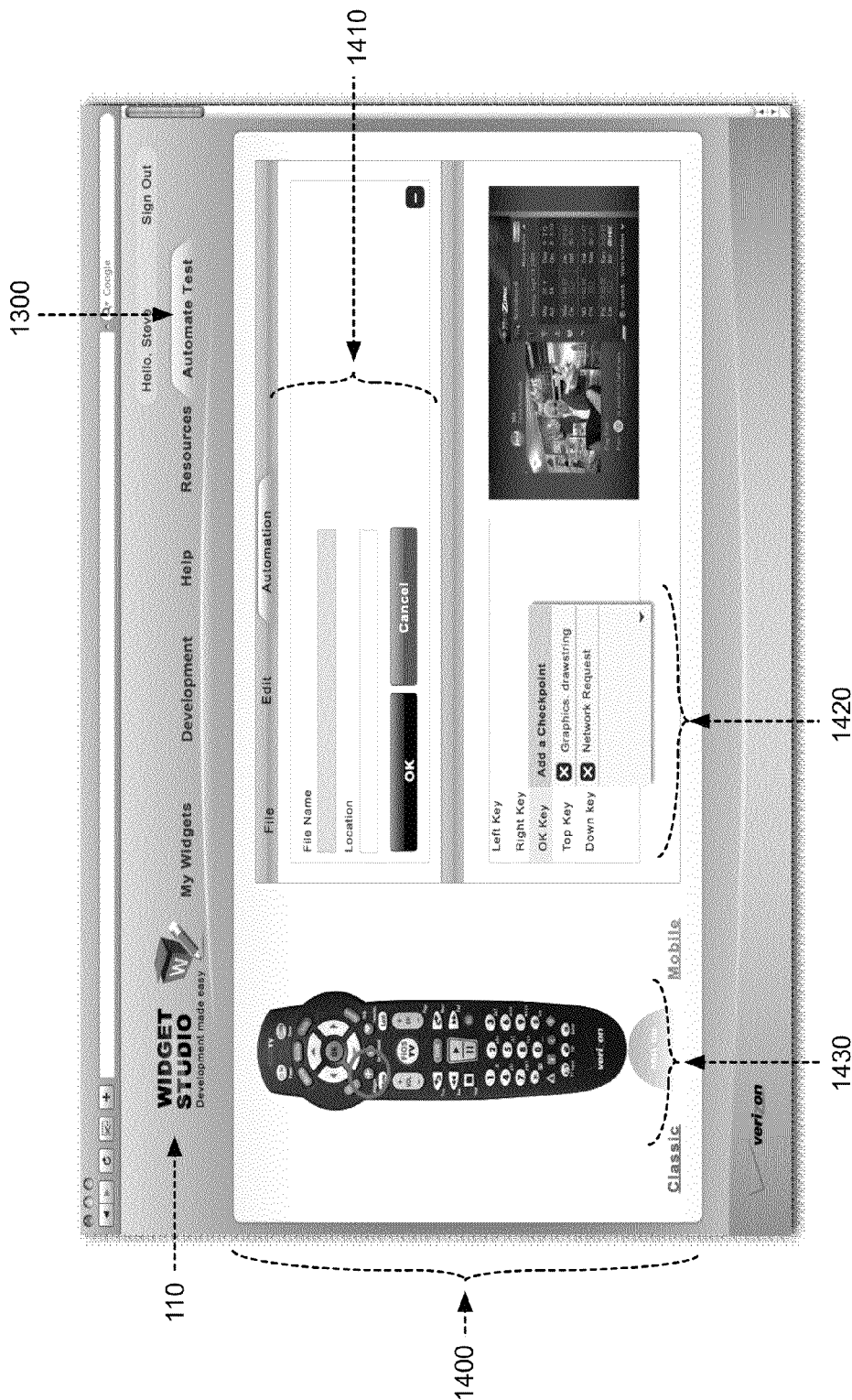

The exemplary process may include determining whether a test case creation selection has been made (block 1200). As shown in the example of FIG. 13, a user of device 100 may select "automate test" tab 1300 from widget development tool 110, and may then select "create a test case" button 1310 to initiate the test case creation process. If a test case creation selection has been made (YES—block 1200), then widget server 210 may present a test case user interface to a user at device 100 for test case creation (block 1210). FIG. 14 depicts an example of a user interface 1400 that may be presented to the user via widget development tool 110.

Widget server 210 may receive a test case name (block 1220) and may receive, or edit, an operation(s) of the test case (block 1230). As shown in the example of FIG. 14, interface 1400 may enable the user to enter a test case name as a file name into window 1410 of interface 1400, and may then receive or edit operations of the test case from a textual list of operations 1420 or from a graphical representation of a remote control device 1430 from which the user may select specific buttons to create operations for the test case. Widget server 210 may determine if the test case creation is complete (block 1240). If the test case creation is complete (YES—block 1240), then widget server 210 may store the created test case (block 1250). The test case, and its associated operation(s), may be stored in widget DB 220. If the test case creation is not complete (NO—block 1240), then widget server 210 may return to block 1230 with the receipt of, or editing of, an operation(s) of the test case.

Figure 15:
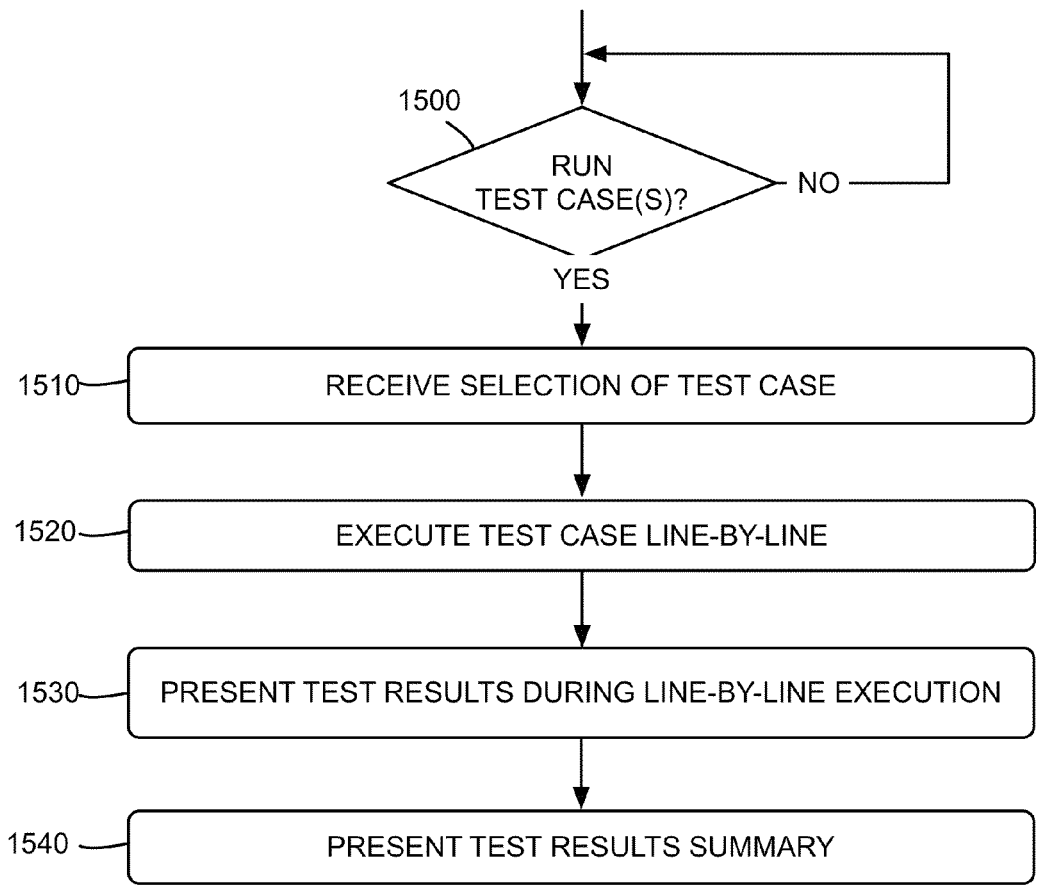
FIG. 15 is a flow diagram that depicts an exemplary process for executing a test case in conjunction with a custom widget.

FIG. 15 is a flow diagram that depicts an exemplary process for executing a test case in conjunction with a custom widget. The exemplary process of FIG. 15 may be implemented by widget server 210 in conjunction with the execution of widget development tool 110 by device 100 via web interface 105. The description of the exemplary process of FIG. 15 below refers to the examples of FIGS. 13 and 16.

The exemplary process may include determining whether a run test case(s) selection has been made (block 1500). Referring to FIG. 13, the user of device 100 may select the "run test cases" button 1320 from "automate test" tab 1300 of widget development tool 110. If a run test case(s) selection has been made (YES—block 1500), then widget server 210 may receive a selection of the test case to run (block 1510). Referring again to FIG. 14, the user of device 100 may manually enter, or select via file browsing, a stored test case via window 1410.

Figure 16:
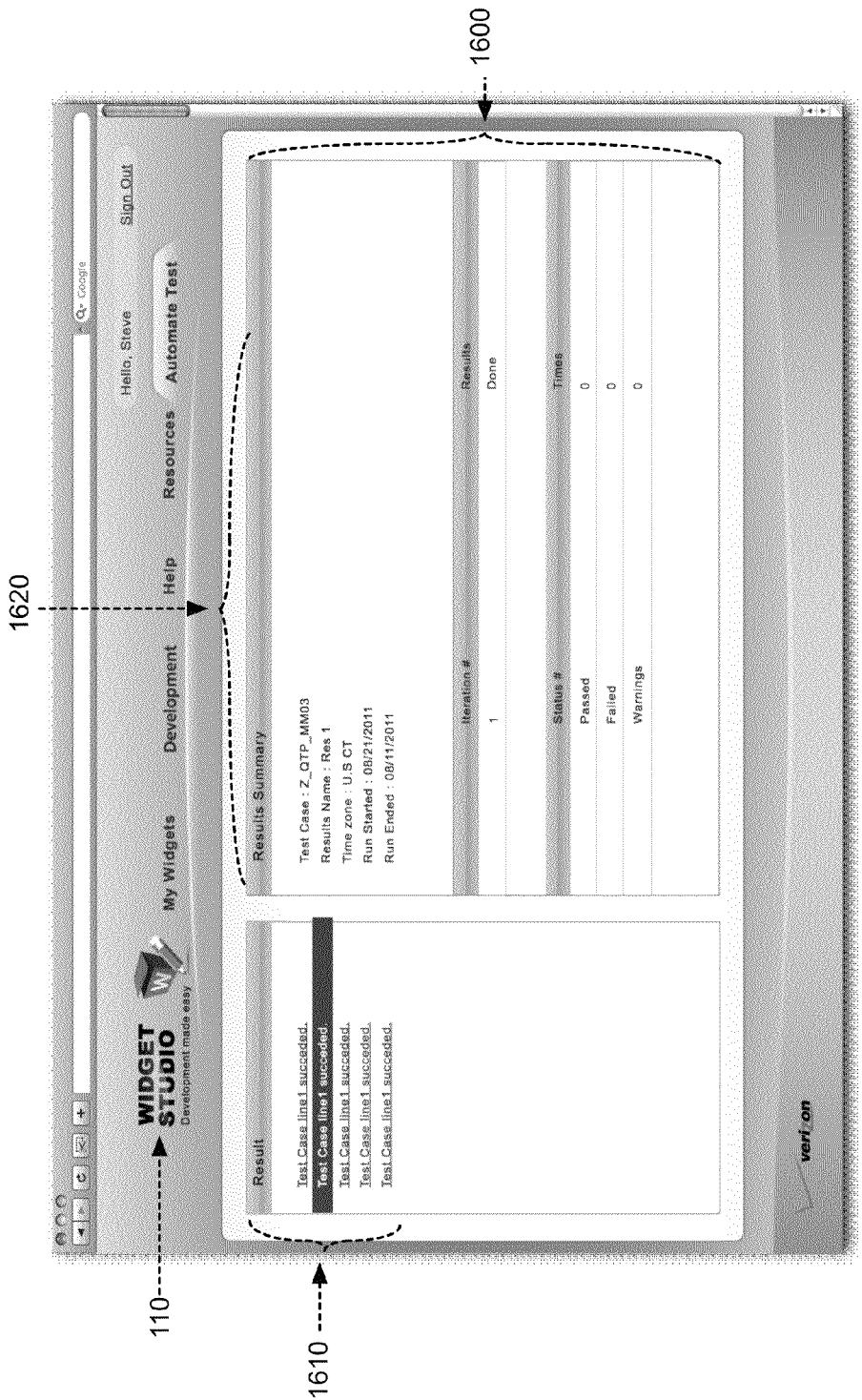
FIG. 16 is a diagram that depicts an example associated with the exemplary process of FIG. 15.

Widget server 210 may execute the selected test case line-by-line (block 1520) and may present the results of the execution of the test case during the line-by-line execution (block 1530). FIG. 16 depicts an interface 1600 of widget development tool 110 that displays the results of execution of the test case selected in block 1510. For example, window 1610 of interface 1600 displays the results (e.g., success or failure) of each test case line as that line is executed in conjunction with an executing custom widget. Widget server 210 may present a summary of the test results (block 1540). As shown in the example of FIG. 16, a results summary window 1620 of interface 1600 may display the summary of results of execution of a test case. The test results summary may include, for example, a number of iterations, a number of successful executions of the test case, a number of failures of executions of the test case, warnings associated with executions of the test case, etc.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 5A-5C, 12 and 15, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

presenting, by a network device via a network, a widget development web user interface to a user device;

receiving, at the network device via the network, code for script of a widget from the user device via the web user interface;

presenting, by the network device via the network and responsive to receiving the code, a list of multiple types of set-top-boxes (STBs) via the web user interface;

receiving, at the network device via the network, a selection of a first type of STB from the list of multiple types of STBs from the user device via the web user interface;

receiving, at the network device via the network, a selection of a first STB environment, from a list of STB environments, presented via the web user interface responsive to the selection of the selected first type of STB;

receiving, at the network device via the network, user selection of a debug mode via the web user interface, executing, by the network device in the debug mode, the script of the widget within the selected first type of STB having the selected first STB environment to test the widget to permit debugging of the script, wherein debugging of the script includes displaying, via the web user interface, graphical representations of user interaction with multiple virtual remote devices and corresponding operations of the selected first type of STB, as the debug mode steps through the script;

re-presenting, by the network device via the network and responsive to not receiving a user selection to edit the script, the list of multiple types of STBs via the web user interface;

receiving, at the network device via the network, a selection of a second type of STB from the list of multiple types of STBs from the user device via the web user interface;

receiving, at the network device via the network, a selection of a second STB environment, from the list of STB environments presented via the web user interface responsive to the selection of the selected second type of STB; and uploading, by the network device via the network, the script of the widget within the selected second type of STB having the selected second STB environment for execution.

2. The method of claim 1, wherein the selected first STB environment differs from the selected second STB environment.

3. The method of claim 1, wherein the web user interface comprises an interactive web-based widget development tool.

4. The method of claim 1, further comprising:
compiling the script based on user selection via the web user interface.

5. The method of claim 1, further comprising:
uploading the widget to the selected first type of STB having the selected first STB environment to execute the script of the widget in the debug mode.

6. The method of claim 1, further comprising:
receiving, responsive to the debugging of the script, edits of the code of the widget from the user device via the web user interface.

7. The method of claim 1, wherein the first STB environment comprises a specific type of hardware, firmware or operating system implemented within the selected first type of STB.

8. The method of claim 1, wherein the selected first and second types of STBs differ from one another.

9. The method of claim 1, wherein the multiple types of STBs comprise multiple different models of STBs.

10. A tangible non-transient computer-readable medium containing instructions executable by at least one processor, the computer-readable medium comprising:
one or more instructions for receiving code for script of a widget from a user via a widget development tool web user interface;
one or more instructions for presenting, responsive to receiving the code, a list of multiple types of STBs via the web user interface;
one or more instructions for receiving a selection of a first type of set-top box (STB) from the list of multiple types of STBs from the user via the web user interface;
one or more instructions for receiving a selection of a STB environment, from a list of STB environments, presented via the web user interface responsive to the selection of the selected first type of STB;
one or more instructions for receiving user selection of a debug mode via the web user interface;
one or more instructions for executing the script of the widget within the selected first type of STB having the selected first STB environment to test the widget to permit debugging of the script, wherein debugging of the script includes displaying, via the web user interface, graphical representations of user interaction with multiple virtual remote devices and corresponding operations of the selected first type of STB, as the debug mode steps through the script;
one or more instructions for re-presenting, responsive to not receiving a user selection to edit the script, the list of multiple types of STBs via the web user interface;
one or more instructions for receiving a selection of a second type of STB from the list of multiple types of STBs from the user via the web user interface;
one or more instructions for receiving a selection of a second STB environment, from the list of STB environments presented via the web user interface responsive to the selection of the selected second type of STB; and
one or more instructions for uploading the script of the widget within the selected second type of STB having the selected second STB environment for execution.

11. The computer-readable medium of claim 10, wherein the selected first STB environment differs from the selected second STB environment.

12. The computer-readable medium of claim 10, further comprising:
one or more instructions for compiling the script based on user selection via the web user interface.

13. The computer-readable medium of claim 10, further comprising:
one or more instructions for uploading the widget to the selected first type of STB having the selected first STB environment to execute the script of the widget in the debug mode.

14. The computer-readable medium of claim 10, further comprising:
one or more instructions for receiving, responsive to the debugging of the script, edits of the code of the widget from the user via the web user interface.

15. The computer-readable medium of claim 10, wherein the first STB environment comprises a specific type of hardware, firmware or operating system implemented within the selected first type of STB.

16. The computer-readable medium of claim 10, wherein the multiple types of STBs comprise multiple different models of STBs.

17. A method, comprising:
creating and testing, by a network device, a first set-top box (STB) widget, by a first user of a user device, using a web-based interactive widget development tool that receives script and edit operations associated with the first STB widget from the first user via graphical representations of first user interactions with a plurality of virtual remote control devices, from which the user selects the edit operations, and corresponding operations of a first STB during execution of the first STB widget;
creating and testing, by the network device, a second STB widget, by a second user, using the web-based interactive widget development tool;
storing, in a network database, the first widget and the second widget in a data structure;
uploading, by the network device, the first widget to a first set of STBs; and
uploading, by the network device, the second widget to a second set of STBs, where the second set comprises a different set of STBs than the first set of STBs.

18. The method of claim 17, wherein the second STB widget is different than the first STB widget.

19. The method of claim 17, wherein the first set of STBs and the second set of STBs receive television content via a same network.

20. The method of claim 17, wherein the first STB widget and the second STB widget each comprise a software application that can be executed by a STB to render graphics and images on a screen, or to perform other functions associated with the STB.

21. The method of claim 17, wherein creating and testing the first STB widget further comprises:
debugging the script.

22. The method of claim 17, wherein testing the first STB widget comprises:
receiving a test case involving user interactions with the remote control device associated with the first STB widget;
running the test case in conjunction with the execution of the first STB widget.

23. A tangible non-transient computer-readable medium containing instructions executable by at least one processor, the computer-readable medium comprising:
one or more instructions for receiving, via a web-based interactive widget development tool, input received from a first user via a plurality of graphical representations of first user interactions with a plurality of remote control devices from which the user selects edit operations, and corresponding operations of a first set-top-box (STB) to create and test a first STB widget;

one or more instructions for receiving, via a web-based interactive widget development tool, input from a second user to create and test a second STB widget;

one or more instructions for uploading the first widget to a first set of STBs; and one or more instructions for uploading the second widget to a second set of STBs, where the second set comprises a different set of STBs than the first STB.

* * * * *